United States Patent
Broesamle

(10) Patent No.: US 7,038,708 B1
(45) Date of Patent: May 2, 2006

(54) FILM SCANNER SYSTEM WITH AN AUTOMATIC FOCUSING DEVICE

(75) Inventor: Michael Broesamle, Weiterstadt (DE)

(73) Assignee: Thomson Licensing, Boulogne-Billancourt (FR)

( * ) Notice: Subject to any disclaimer, the term of this patent is extended or adjusted under 35 U.S.C. 154(b) by 242 days.

(21) Appl. No.: 09/704,590

(22) Filed: Nov. 2, 2000

(30) Foreign Application Priority Data

Nov. 2, 1999 (DE) .......................... 199 52 608

(51) Int. Cl.
*H04N 5/253* (2006.01)

(52) U.S. Cl. ........................................ 348/97

(58) Field of Classification Search ............... 348/96, 348/97, 101, 102, 103, 104, 105, 107, 108, 348/109, 110, 111, 205.99, 210.99; H04N 5/753
See application file for complete search history.

(56) References Cited

U.S. PATENT DOCUMENTS

| | | | | |
|---|---|---|---|---|
| 3,812,525 A | * | 5/1974 | Hilbert | 348/711 |
| RE33,185 E | * | 3/1990 | Matsuda et al. | 396/103 |
| 4,928,170 A | * | 5/1990 | Soloveychik et al. | 348/63 |
| 5,105,278 A | * | 4/1992 | Takemoto | 348/356 |
| 5,430,478 A | * | 7/1995 | Kaye et al. | 348/99 |
| 5,452,005 A | * | 9/1995 | Kubo et al. | 348/350 |
| 5,457,491 A | * | 10/1995 | Mowry | 348/104 |
| 5,767,989 A | | 6/1998 | Sakaguchi | |
| 6,043,476 A | * | 3/2000 | Tsai | 250/205 |
| 6,169,571 B1 | * | 1/2001 | Rivers et al. | 348/96 |
| 6,320,607 B1 | * | 11/2001 | Takasaki | 348/64 |
| 6,636,646 B1 | * | 10/2003 | Gindele | 382/274 |

FOREIGN PATENT DOCUMENTS

| | | |
|---|---|---|
| EP | 0017726 A1 | 10/1980 |
| EP | 0017726 | 10/1980 |
| EP | 0820191 A3 | 1/1998 |
| EP | 0820191 A2 | 1/1998 |
| EP | 0830191 A2 | 1/1998 |
| EP | 1098516 A1 | 10/2000 |
| EP | 0820191 | 12/2000 |
| JP | 05-316399 | 11/1993 |

* cited by examiner

*Primary Examiner*—Nhon Diep
(74) *Attorney, Agent, or Firm*—Joseph J. Laks; Ronald H. Kurdyla; Joel M. Fogelson

(57) ABSTRACT

In a film scanner with an automatic focusing device in which the film images are shown line by line by means of an objective on at least one line sensor, with a still film the adjusting range of the objective is passed through according to a predefined program. The then developing video signals are evaluated for their high frequency component. The objective is adjusted to the maximum of the high frequency component.

25 Claims, 1 Drawing Sheet

FILM SCANNER SYSTEM WITH AN AUTOMATIC FOCUSING DEVICE

BACKGROUND OF THE INVENTION

The invention relates to a film scanner with an automatic focusing device in which the film images are shown line by line by means of an objective on at least one line sensor.

Manually focusing of film scanners inter alia has the drawback that the perception of the definition by human beings is irritated by the picture content. Furthermore, a relatively long dead time then exists, which leads to a transgression of the natural reaction and thus an "overwind" effect. This means that the user turns the adjusting knob, because the system cannot follow so fast and thus overshoots the goal to be attained. Especially with very brief scenes of, for example, 20s to 30s, as they often occur in commercials, it is thus hard to find the focal point.

It is true, various methods of automatic focusing are already known, for example, from EP 0 017 726 A1. However, they do not solve the problems discussed in the introductory paragraphs.

SUMMARY OF THE INVENTION

It is an object of the present invention to provide a film scanner with a focusing device that does not have the above drawbacks.

This object is achieved according to the invention, in that with a still film the adjusting range of the objective is passed through according to a predefined program, in that the then developing video signals are evaluated for their high-frequency component and in that the objective is adjusted to the maximum of the high-frequency component.

An advantageous embodiment of the invention is that the film is scanned in the interstice between two images (image gap). Also the grain of the film occurring in the image gap is used for the focusing.

Another embodiment of the invention is that the film is scanned within an image and that during the evaluation of the video signals the image content is suppressed particularly by autocorrelation.

A further embodiment including an advantageous evaluation of the video signals consists of the fact that for measuring the high-frequency component, differences are formed between the amplitudes of the picture elements neighboring the video signals. This enables a measurement of the high-frequency component in simple calculation steps in a digital signal processor. Alternatively, however, there may also be provided that for measuring the high-frequency component, the video signals are subjected to a Fast Fourier Transform (FFT).

For the case where the color setting is not accurate enough after the whole adjusting range of the objective has been passed through and the video signals have subsequently been evaluated, in a further embodiment there may be provided that after the adjusting range has been passed through, a smaller range of the objective is passed through, which small range includes the previously defined maximum, and in that the objective is adjusted to a further maximum which is determined after the smaller range has been passed through. Depending on detailed conditions it is also possible to have several iterations in the sense of this further embodiment.

Another further embodiment comprises that for determining the maximum from the scanning values of each picture element obtained while the adjusting range is passed through, a respective curve is generated, that for each curve a maximum is derived and that an average value of the positions of the maximums is formed while the maximums that lie outside a predefined spread are not taken into account. Due to this averaging as such, statistical influences, more particularly noise portions of the signal, are excluded from the evaluation. Since the maximums that lie outside the predefined spread are not taken into account, it is particularly avoided that scratches on the carrier side opposite the layer lead to a distortion of the focusing.

In an advantageous embodiment of this further feature it is provided that for determining the maximums the respective function is differentiated and a zero is determined.

A further advantageous embodiment of the invention comprises that the video signals are written in a vertical format buffer and transmitted from there to a digital signal processor which is programmed for determining the maximum. This safeguards, on the one hand, that the digital signal processor can access signals as required which develop from successive scannings of the same picture elements. On the other hand, vertical format buffers can also be used, which are found in film scanners anyway, for example, for compensating for the so-called fixed pattern noise (FPN).

The still film may be damaged as a result of a lighting that lasts longer than 5s. Damage to the picture content owing to permanent lighting may be largely avoided when the above-mentioned embodiment of the invention is used, in which the image gaps are scanned. However, it has proved to be advantageous that in accordance with a further aspect, in line with the predefined program the lighting of the film is controlled so that the film is not lighted when the scanning does not need this. With this further aspect, for example, a diaphragm can be opened for as long as the adjusting range of the objective is passed through.

BRIEF DESCRIPTION OF THE DRAWINGS

Examples of embodiment of the invention are shown in the drawing with reference to a plurality of Figures and further explained in the following description, in which.

DESCRIPTION OF THE PREFERRED EMBODIMENTS

Figure 1:
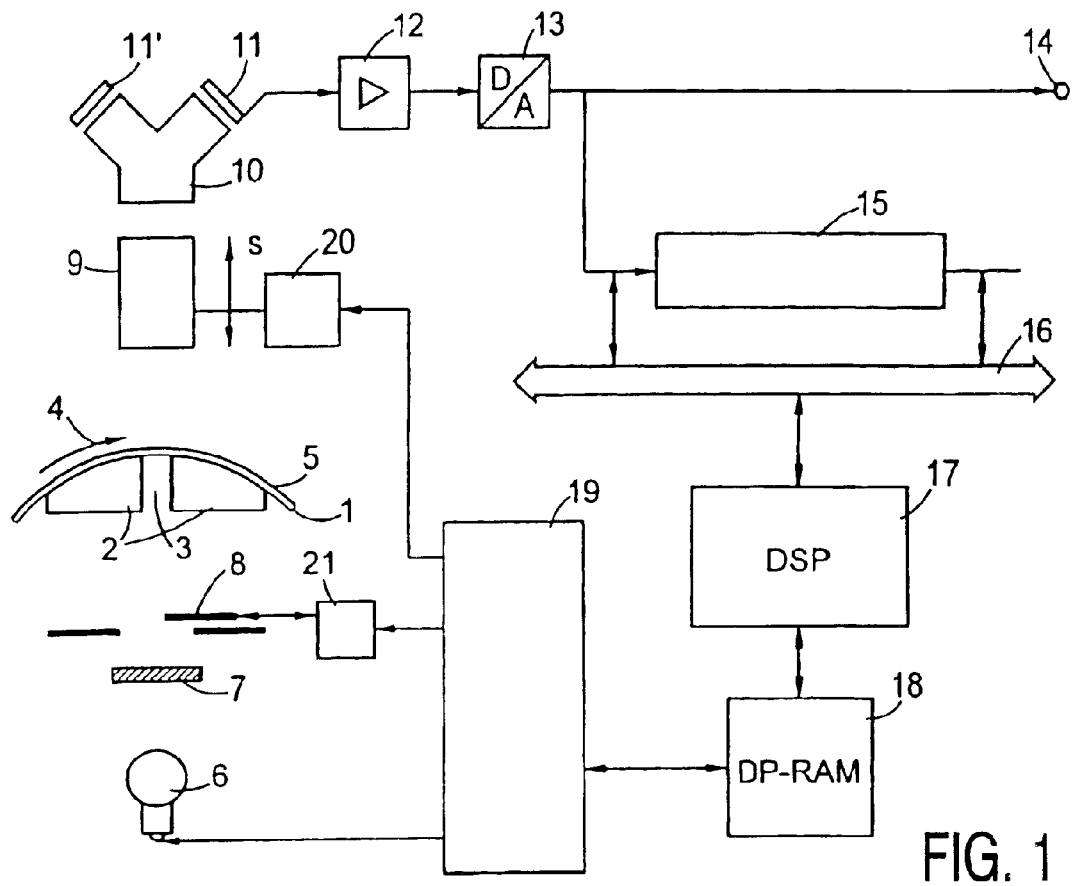
FIG. 1 shows a block diagram of a device according to the invention on a film scanner, and FIG. 2 diagrammatically shows video signals used for the focusing.

FIG. 1 diagrammatically shows only the parts of a film scanner necessary for explaining the invention. The film 1 shown in enlarged form as regards its thickness is led by film-guiding elements 2, which also form a film gate 3. For the continuous scanning of the film 1, the film is moved, for example, in the direction of the arrow 4. The layer 5 of the film is then applied to the side of the film that does not contact the film-guiding elements 2.

A lighting device 6 lights the film via a filter 7 and a diaphragm 8. The diaphragm 8 may be an iris diaphragm having an additional diaphragm for completely interrupting the luminous flux. For clarity, FIG. 1 only diagrammatically shows one diaphragm (8) interrupting the luminous flux.

A respective lighted line is depicted on two line sensors 11, 11' with the aid of an objective 9 and a color ray divider 10. The line sensor 11 is then used for generating a luminance signal, whereas the line sensor 11' detects the chrominance information, which is not further explained in the example of embodiment shown. The invention may, however, also be used for film scanners having, for example, three sensors for the respective chrominance signals R, G and B. The output signal of the line sensor 11 is applied to an analog-to-digital converter 13 via a preamplifier 12 and can be tapped from the output 14 to be further processed, for example, buffered, gamma corrected and its chrominance adjusted.

From the output of the analog-to-digital converter 13 the digital video signal is further fed to a vertical format buffer 15. Its input and its output are connected by a bus system 16 to a digital signal processor 17. This digital signal processor 17 is connected via a DUAL PORT RAM 18 to a processor 19 which is used for controlling the whole film scanner. In film scanners used in practice such a task is usually spread over a plurality of processors which, however, is not essential to the explanation of the invention. In addition to other functions, the processor 19 controls the focusing of the objective 9 via a driver arrangement 20. Furthermore, the processor 19 can control the lighting device 6 and, via a driver arrangement 21, the diaphragm 8.

In the example of embodiment shown, for the focusing of the inserted film 1 it is aligned by film drivers (capstan, rollers) that can also be controlled by hand, arranged so that in the film gate 3 an image gap comes to a halt. After a start command has been given, the processor 19 passes through the adjusting range of the objective according to a predefined program and during this time the diaphragm 8 is kept open. The video signals then developed are continuously written in a vertical format buffer 15 which is arranged as a FIFO memory, so that the signal processor 17 can detect via the bus system 16 pairs of time consecutive values of the same picture element and their differences. For all the picture elements and for all the instantaneous values occurring during the movement of the diaphragm, the differences are buffered in the digital signal processor 17. Due to the controlled movement of the objective 9, the instantaneous values correspond to the values for the corresponding position s of the objective 9.

After the adjusting range of the objective has been passed through, the digital signal processor 17 calculates curves, for example, splines for each picture element by connecting the respective curves of scanning values, and their maximums are determined by differentiating and zeroing. The maximum values are then averaged while values lying outside a spread are not taken into account. The result is then applied via the DUAL-PORT-RAM 18 to the processor 19 which determines a new, smaller adjusting range, opens up the diaphragm 8 again and passes through thie new adjusting range of the objective. The described evaluation is then repeated and the result is again applied via the DUAL-PORT-RAM 18 to the processor 19, which then adjusts the objective 9 in accordance with the result.

Figure 2:
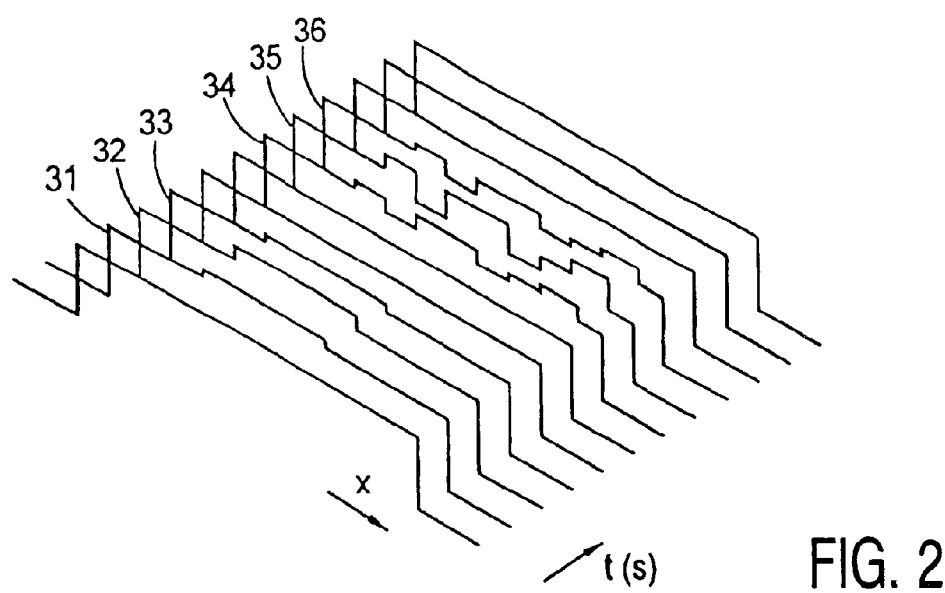

FIG. 2 diagrammatically shows several lines of the video signal while the adjusting range of the object 9 is passed through (FIG. 1). x refers to the direction of the lines while the time t or covered distance s respectively, of the objective is shown perpendicular thereto. With the movement in the direction of the arrow, the focus shifts from bottom to top relating to the representation given in FIG. 1. Whereas in the line shown first no information can be recognized, in line 31 a scratch on the underside of the film begins to show.

With line 32 the scratch shows sharply and thus has a relatively large amplitude over several picture elements, so that also the differences to the neighboring picture elements become large. They diminish again in line 33 after which, after several lines, the grain of layer 5 (FIG. 1) first results in smaller (line 34) and then larger (line 35) and then smaller again (line 36) amplitude differences. Due to the highly simplified representation in FIG. 2, of the signals determined by layer 5, only the maximum can be recognized in line 35. With the averaging described above also the line 35 comes out as the place having the largest sharpness, while line 32 is not taken into account in the evaluation.

What is claimed is:

1. A film scanner with an automatic focusing device in which film images are shown line by line by means of an objective on at least one line sensor, wherein with a still film an adjusting range of the objective is passed through according to a predefined program, in that at least one of then developing video signals is evaluated for a high-frequency component and in that the objective is adjusted to the maximum of the high-frequency component, wherein after the adjusting range has been passed through, a smaller range of the objective is passed through, the smaller range includes the previously defined maximum, and in that the objective is adjusted to a further maximum which is determined after the smaller range has been passed through.

2. A film scanner as claimed in claim 1, wherein the film in an image gap between two images is scanned.

3. A film scanner as claimed in claim 1, wherein the film is scanned within an image and that during the evaluation of the at least one of said video signals, the image content is suppressed particularly by autocorrelation.

4. A film scanner as claimed claim 1, wherein when measuring the high-frequency component, differences are formed between the amplitudes of the picture elements neighboring the video signals.

5. A film scanner as claimed in claim 1, wherein when measuring the high-frequency component, the at least one video signals are subjected to a Fast Fourier Transform.

6. A film scanner as claimed in claim 1, wherein the at least one of said video signals are written in a vertical format buffer and transmitted from there to a digital signal processor which is programmed for determining the maximum.

7. A film scanner as claimed in claim 1 in line with the predefined program, lighting of the film is controlled so that the film is not lighted when the scanning does not need this operation.

8. Method for focusing a film scanner having an objective to project film images on at least one line sensor, the method comprising the steps of passing through according to a predefined program an adjustment range of the objective with a still film, evaluating developing video signals then developing for their high frequency component, and adjusting the objective to the maximum of the high frequency component, wherein by passing through a smaller range of the objective after the adjustment range of the objective has been passed through wherein the smaller range includes the previously defined maximum, and adjusting the objective to a further maximum which is determined after the smaller range has been passed through.

9. Method as claimed in claim 8, wherein the film in an image gap between two images is scanned.

10. Method as claimed in claim 8, comprising the additional step of scanning the film within an image and suppressing the image content by autocorrelation during the evaluation of the video signals.

11. Method as claimed in claim 8, where the video signals are processed with a Fast Fourier Transformation for measuring high frequency components said processed video signals.

12. Method as claimed in claim 8, comprising the additional step of:

controlling lighting of the film in line with the predefined program so that the film is not lit when the scanning step does not require a light to scan the film.

13. A film scanner with an automatic focusing device in which film images are shown line by line by means of an objective on at least one line sensor, wherein with a still film an adjusting range of the objective is passed through according to a predefined program, in that at least one of then developing video signals is evaluated for a high-frequency component and in that the objective is adjusted to the maximum of the high-frequency component, wherein when determining the maximum from scanning values of each picture element obtained while the adjusting range is passed through, a respective curve is generated, in that for each curve a maximum is derived and in that an average value of the positions of the maximums is formed while the maximums that lie outside a predefined spread are not taken into account.

14. A film scanner as claimed in claim 13, wherein the film in an image gap between two images is scanned.

15. A film scanner as claimed in claim 13, wherein the film is scanned within an image and that during the evaluation of the at least one of said video signals, the image content is suppressed particularly by autocorrelation.

16. A film scanner as claimed claim 13, wherein when measuring the high-frequency component, differences are formed between the amplitudes of the picture elements neighboring the video signals.

17. A film scanner as claimed in claim 13, wherein when measuring the high-frequency component, the at least one video signals are subjected to a Fast Fourier Transform.

18. A film scanner as claimed in claim 13, wherein when determining the maximums, the respective function is differentiated and a zero is determined.

19. A film scanner as claimed in claim 13, wherein the at least one of said video signals are written in a vertical format buffer and transmitted from there to a digital signal processor which is programmed for determining the maximum.

20. A film scanner as claimed in claim 13 in line with the predefined program where the lighting of the film is controlled so that the film is not lit when the scanning does not need this operation.

21. Method for focusing a film scanner having an objective to project film images on at least one line sensor, the method comprising the steps of;

passing through according to a predefined program an adjustment range of the objective with a still film, evaluating developing video signals then developing for their high frequency component, adjusting the objective to the maximum of the high frequency component determining the maximum from the scanning values of each picture element obtained while the adjusting range is passed through;

generating a respective curve corresponding to each maximum; and deriving for each curve corresponding to each maximum as to form an average value of the positions of the maximums while maximums that lie outside a predefined spread are not taken into account.

22. Method as claimed in claim 21, wherein the film in an image gap between two images is scanned.

23. Method as claimed in claim 21, comprising the additional step of scanning the film within an image and suppressing the image content by autocorrelation during the evaluation of the video signals.

24. Method as claimed in claim 21, where the video signals are processed with a Fast Fourier Transformation for measuring high frequency components of said processed video signals.

25. Method as claimed in claim 21, comprising the additional step of:

controlling lighting of the film in line with the predefined program so that the film is not lighted when the scanning step does not require a light to scan the film.

* * * * *